Feb. 11, 1936.   R. L. PATE, JR   2,030,533
AUTOMATIC LUBRICATING MECHANISM
Filed Aug. 5, 1933   2 Sheets-Sheet 1
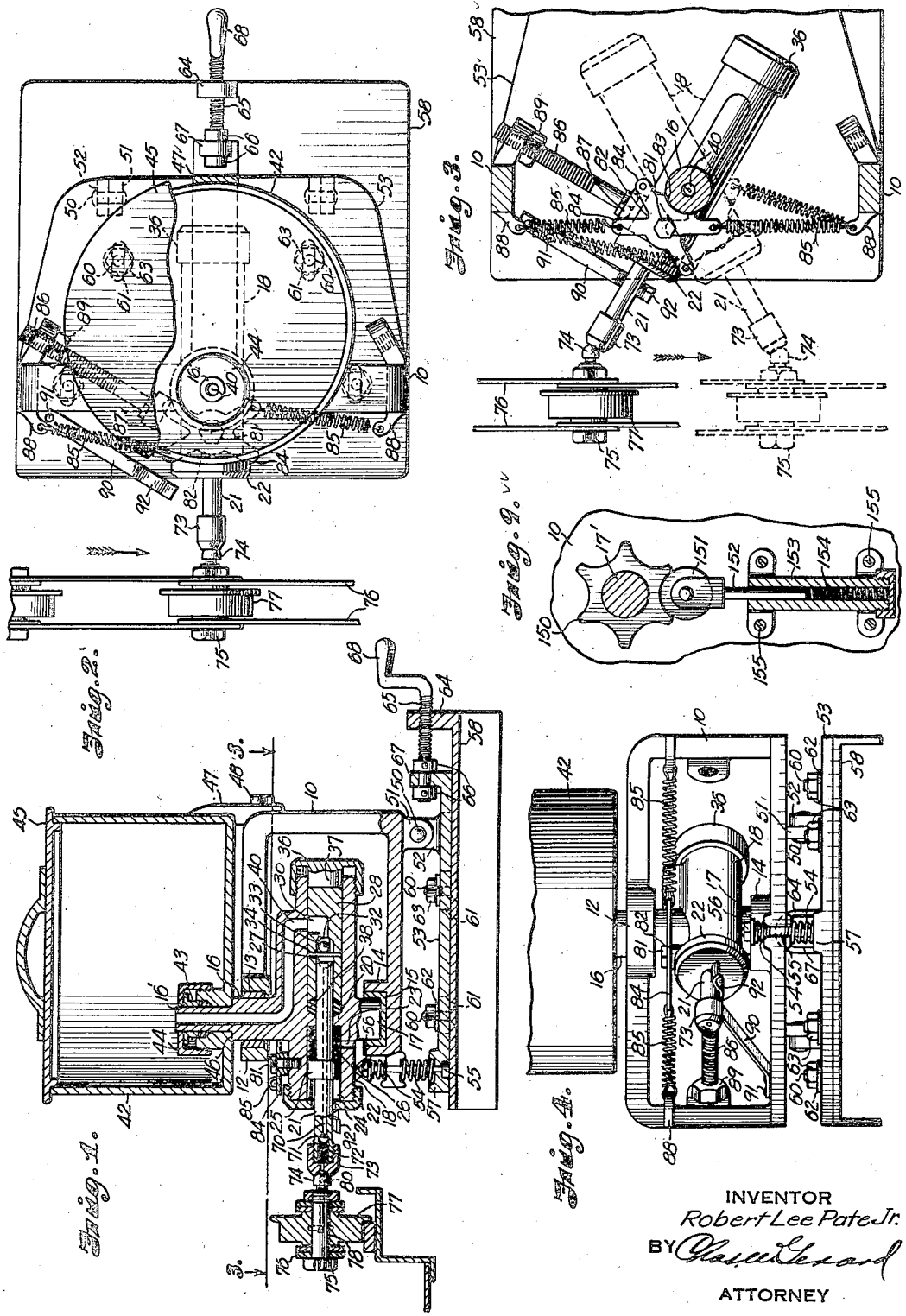
INVENTOR
Robert Lee Pate Jr.
BY
ATTORNEY

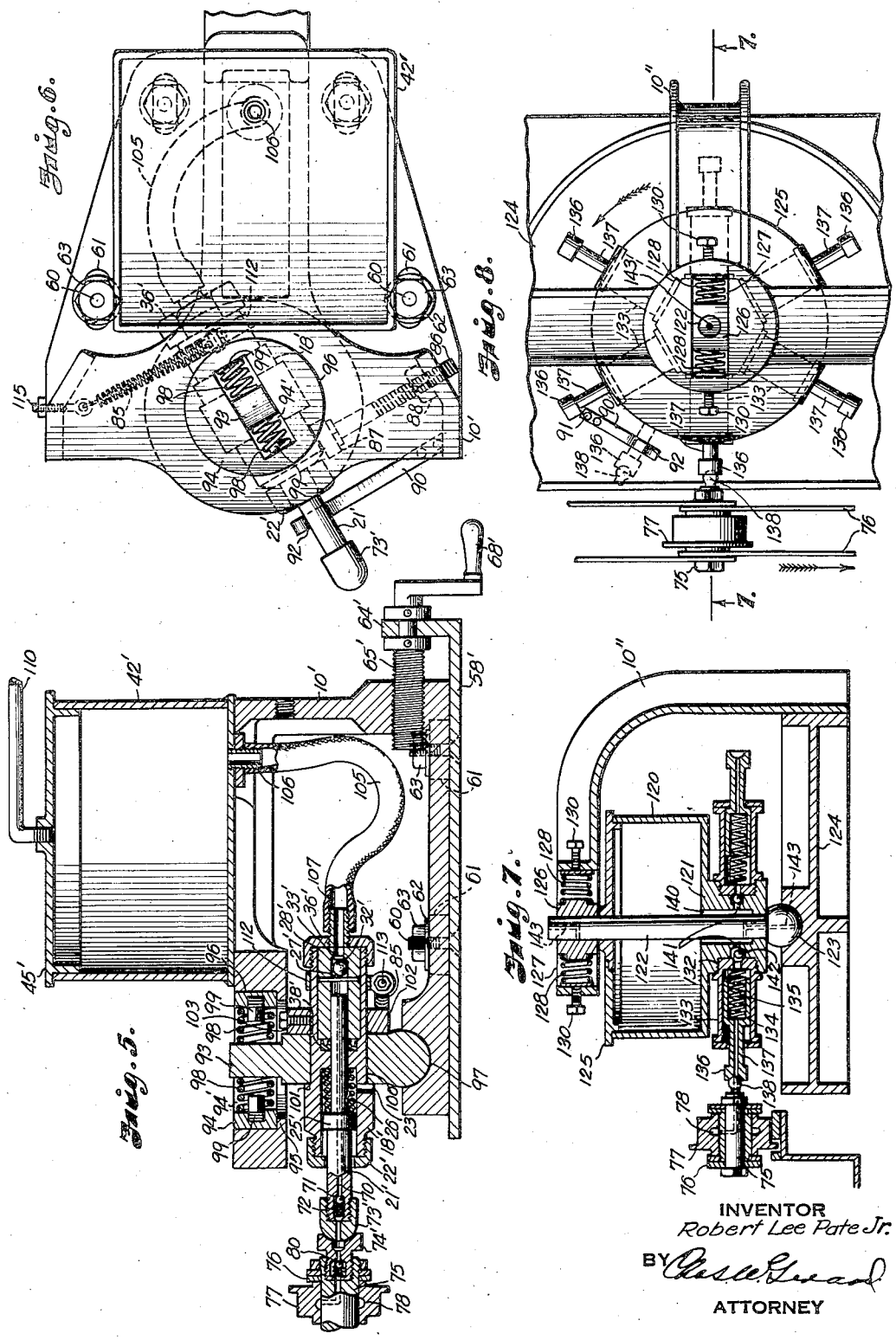

Patented Feb. 11, 1936

2,030,533

UNITED STATES PATENT OFFICE 2,030,533

AUTOMATIC LUBRICATING MECHANISM

Robert Lee Pate, Jr., Pittsburg, Kans.

Application August 5, 1933, Serial No. 683,785

11 Claims. (Cl. 184—15)

The present invention relates to lubricating devices, with particular reference to means for the lubrication of moving equipment, such as travelling chains, including trunnion roller assemblies and the like, and the primary object in view is to provide a novel and practical mechanism for the efficient lubrication of such moving parts during the normal movement of the same and without disturbing the operative functions of the equipment being so lubricated.

Accordingly, I have devised a novel and efficient lubricating mechanism which is adapted to be associated in connection with equipment of the character indicated, such as travelling chains, and moved into and out of lubricating position, adjacent to the path of travel of the chain, and actuated automatically for effecting the lubricating operation, when in such operative position, by the power or energy derived from the moving chain itself. By the construction provided, the travelling movement of the chain produces not only the operative movement of the lubricating means for transferring the lubricant to the chain, but also the necessary pressure with which the lubricant is fed to the chain, although other pressure means may be used if desired.

A further important feature of the improvements is the provision of means whereby the lubricating operation may be carried out either with chains of different pitch, or even chains having a varying pitch, such as may be caused by stretch or wear.

In the construction herein illustrated, this object is accomplished by providing a predetermined point of operative engagement of the chain with the lubricating device, regardless of the length of the lubricating intervals, or distances between the points on the chain to be lubricated, the mechanism thus automatically timing itself and the successive lubricating operations in accordance with the spaces between the points to be lubricated along the travelling chain with which the mechanism is being used.

A still further feature of the improved construction is that which compensates for slight variations in the chain fittings from a given path of horizontal travel.

As one practical means of construction for accomplishing these objects, I illustrate herein both rotary and oscillating types of lubricating mechanisms, adapted either for intermittent rotary movement between successive lubricating steps, or for intermittent pivotal or swinging movement for effecting the successive lubricating operations, each type of construction, however, providing means for accurately positioning the mechanism after each lubricating action, for insuring proper operative engagement with the chain for the next succeeding step of the lubrication.

With the foregoing general objects in view, as well as various minor objects as will appear in the course of the detailed specification, the invention will now be described with reference to the accompanying drawings illustrating typical embodiments of construction which I have devised for accomplishing the several purposes of the invention, after which those features and combinations deemed to be novel will be particularly set forth and claimed.

In the drawings—

Figure 1 is a vertical sectional view showing one form of construction embodying the invention;

Figure 2 is a plan view of the same, with a portion of the framework and lubricant receptacle broken away;

Figure 3 is a horizontal sectional view, representing a section taken on the line 3—3 of Figure 1, but showing different operative positions of the parts and a portion of the framework omitted;

Figure 4 is a front elevation of the device;

Figure 5 is a vertical sectional view showing a modified form of construction;

Figure 6 is a plan view of the same (the cover of the lubricant receptacle being omitted);

Figure 7 is a vertical sectional view showing a further modified or rotary type of construction and representing a section taken on the line 7—7 of Figure 8;

Figure 8 is a plan view of the same; and

Figure 9 shows a modified form of positioning and retaining means for the lubricating member.

Referring now to said drawings in detail, and more particularly to Figures 1–4 inclusive, these views illustrate the improvements as embodied in an oscillating type of construction comprising a single lubricating device which is mounted for swinging movement about a vertical axis within a frame which is permitted a certain degree of vertical compensating movement as hereinafter explained. For this purpose I provide an open frame member 10 having an upper bearing portion 12 and a lower bearing 14 in vertical alinement, and fitted with suitable bushings 13 and 15 for accommodating the upper and lower journals 16, 17, of the cylinder 18 comprising the principal operating member, or what I may term the lubricating gun for producing the necessary feeding movement as well as pressure discharge of the lubricant in the lubricating operation. The cylinder 18 is formed with an interior bore and an interior bearing 20 for the inner end of a sliding plunger tube 21, the outer end of which tube slidingly engages a cap 22 fitted to what may be termed the front end of the cylinder and serving as a closure for the chamber 24; this chamber has a vent 23 and comprises the front end portion of the cylinder bore and also houses the enlarged portion 25 of said plunger tube 21, which serves as a shoulder for engaging a coil spring 26 encircling the plunger tube between said shoulder 25 and the bearing 20. The rear end of the plunger tube fits slidingly in a central passage 27 formed in a block 28 occupying the rear end of the cylinder bore and also cored out to provide a lubricant-receiving space 30 communicating with said passage 27 by way of a valve port 32 controlled by a ball check valve 33 retained in position by a suitable pin 34. The rear end of the cylinder is fitted with a cylinder cap 36 formed with a central boss 37 fitting the cylinder bore and engaging said block 28 for maintaining the inner end of the latter in compressing engagement with suitable packing 38 which is seated against the bearing 20.

In the top of the cylinder 18 is also formed a lubricant duct 40 communicating with the space 30 and also extending up through the journal 16 as well as through a reduced vertical extension 16' from said journal which is projected within a bearing formed in the bottom of the lubricant reservoir or receptacle 42; a packing gland 43 is provided for said extension 16' and held in place by a cap nut 44. The receptacle 42 is provided with a suitable cover 45 and is held in supported relation to the shoulder 46 on the journal 16 by means of a bracket finger 47 attached by a screw 48 to the frame 10. Thus the receptacle 42 is maintained in continuous feeding communication with the duct 40, while in no way interfering with the turning movement of the cylinder upon its trunnions 16—17.

The frame 10 is supported for a limited degree of rocking movement by means of pivotal mountings comprising pins 50 connecting depending lugs 51 at the rear of the frame with upstanding lugs 52 carried by an adjustable base plate 53. At the front of the frame 10 is provided a pair of suitable buffer springs 54 seated above and below the front margin of the frame and retained by a bolt 55 and adjusting nut 56, whereby they are connected with the front margin of the base plate 53, which is formed with a seat 57 for the lower spring 54. This construction enables the frame 10 to rock sufficiently for compensating for variations in the horizontal line of travel of the chain; and, for adjusting the frame and its support toward and from the chain, a sub-base 58 is provided for the plate 53 and connected therewith by means of bolts 60 extending through slots 61 in said plate and retained by suitable washers 62 and nuts 63; at the rear of the sub-base 58 is provided a lug 64 threaded for an adjusting screw 65, one end of which is retained by means of spaced collars 66 in rotative engagement with a lug 67 at the rear edge of the plate 53, the other end of said screw being formed with a suitable operating handle 68.

Thus by operation of the handle 68 the lubricating mechanism may be advanced or retracted into and out of operative position, or suitably adjusted as required for making the necessary operative engagement with the chain fittings, as will be readily understood.

The plunger tube 21 is formed with a central lubricant duct 70 open at both ends, and having a ball check valve 71 near its outer end, held normally closed by a coil spring 72, which spring is retained in position by a suitable nipple or lubricant discharge element 73 screwed on to the end of the tube 21. This element 73 is designed to make effective operative and lubricant-communicating contact with the fittings 74 which are provided on the ends of the pins 75 forming parts of the chain 76 and roller 77 assemblies, and having the ducts 78 for distribution of the lubricant throughout the roller trunnion structure—as illustrated in Figure 1.

The elements 74 may also be provided with spring-actuated check valves 80, the two valves 71 and 80 preventing waste of the lubricant by dripping when said fittings are disengaged. As shown, the contacting faces of these fittings 73 and 74 are of male and female design for effective engagement in the lubricant discharge operation, and permitting a limited degree of sliding or wiping contact as required, as they travel together in unison during said operating interval; obviously, it is immaterial which of each pair of the fittings is of the male and which of the female type. The fittings for both the lubricator and chain are shown as detachable, therefore interchangeable, in order to permit use of the design of fitting best adapted for the type of chain or apparatus to be lubricated.

Secured to the cylinder 22, as by means of a screw 81, is an attachment 82 having a recessed margin 83 engaging the journal 16, and provided with a plurality of arms 84 projecting angularly at each side of the cylinder for the purpose of attaching a pair of coil springs 85, in the relation illustrated in Figures 2 and 3, the outer ends of the springs being attached to fixed lugs 88 at the outer sides of the frame member 10. These springs operate to return the cylinder to its initial position of rest shown by the full lines in Figure 3, after each operation as produced by the movement of the chain after engagement of the fittings 73 and 74, as represented in Figures 1 and 2 and by the dotted lines in Figure 3. The provision of the two pairs of arms 84 enables the inner ends of the springs to be shifted in order to reverse the spring action in accordance with the direction of travel of the chain.

A stop pin 86, provided with a suitable buffer 87 for engagement with the side of the cylinder 22, may be provided for limiting the return movement of the latter, said pin being threaded for attachment to either side of the frame member 10, and also provided with an adjustable clamping nut 89.

As a further means for stabilizing said return movement of the cylinder, a spring element 90 is attached by screws 91 to the frame 10 in position for the terminal stirrup portion 92 at the free end of the spring to engage with the rod 21 in its initial position of rest, as shown in Figures 2 and 3. Thus, the spring 90 serves to prevent any rebound of the lubricator at the end of each lubricating operation, and likewise functions as a positioning means which under some conditions may render the stop pin 86 unnecessary. It will also be understood that neither the stop nor the spring 90 is an indispensable element where two springs 85 are employed, since such springs will return the lubricator to a given initial position; whereas, a single spring 85 may effectively operate the device in conjunction with a stop 86, though preferably combined with the spring element 90.

In the operation of the construction above described, the device is mounted in position along-side the path of travel of the chain, as illustrated, and adjusted to locate the nozzle of the gun in exact position for proper engagement with the chain fittings 74 at an angle thereto, approximately as illustrated in Figure 3. The flow of lubricant from the reservoir through the passage 40 into the gun is maintained by the combined action of gravity and the suctional action produced by the gun's operation, the outward movement of course acting to open the check valve 33 and admit lubricant into the space 27 and the bore of the plunger. On engagement of the fittings 73—74 and continued movement of the chain in the direction of the arrow (Figures 2-3) an oscillating or pivotal movement is imparted to the gun, disengaging it from the spring 90 and swinging it into the position shown by the dotted lines in Figure 3, in opposition to the pull of the upper spring 85. The first half of this movement, from initial position into the position shown in Figures 1 and 2, produces an inward or retracting movement of the plunger against the action of spring 26, which automatically closes the valve 33 and forces open both the valves 71 and 80, thus allowing the lubricant to be discharged from the gun into the chain fitting. As the chain travels and thereby moves the parts into the position shown by the dotted lines in Figure 3, said valves 71 and 80 are automatically closed by means of their springs to prevent any loss of the grease by dripping, and the continued travel of the chain finally releases the gun, which is then automatically returned by its springs into initial position. Also after passing the position shown in Figure 2, while the gun is still travelling in the direction of the arrow in Figures 2 and 3, the spring 26 imparts an outward movement to the plunger, resulting in opening of the valve 33 and a new flow of grease to the gun by the combined action of suction and gravity, as will be readily understood.

Any irregularity in the travel of the chain, deviating from a true horizontal line, will of course be accommodated by the pivotal mounting of the frame 10 carrying the gun. It may also be mentioned that the operation of the lubricating device would be the same regardless of how the lubricant is supplied thereto, and while the reservoir is shown as a convenient part of the assembly, it is altogether immaterial how the lubricant is fed to the passage 40, as this may be connected with any source of supply, including pressure means if desired.

Referring now to the form of illustration shown in Figures 5 and 6, these views show the lubricant receptacle 42' as mounted directly upon the frame 10' and the latter merely provided with a sliding adjustment upon the base plate 58' by virtue of the bolts 60 and the slots 61, together with the operating screw 65', a somewhat different arrangement being provided for accommodating the gun to irregularities in the chain's travel, as follows.

The cylinder 18' is carried by an upright supporting member 93 which is mounted for both pivotal and rocking movement as provided by the spherical bearing 97 between the lower end of said member and the base of the frame 10'; the square upper end of said member projects through a guide opening 94' in a circular block 94 resting on a shoulder 95 in a circular opening 96 in the upper portion of the frame 10', said block being provided with a pair of coil springs 98 engaging opposite sides of the member 93, and retained by suitable pins 99. The member 93 is formed with a transverse opening 100 receiving the cylinder 18' which is shouldered at 101 against one side of the member and secured in place by a clamping collar 102 and screw 103 at the opposite side of said member.

The plunger and valve construction of the gun are essentially the same as in the preceding construction, as represented by primed numerals, the plunger in this instance being fitted with a male type of nozzle fitting 73' engaging suitable female fittings 74' carried by the pins 75 of the roller chain 76; however, a flexible type of lubricant connection is necessary between the rear end of the gun and the reservoir 42', which I provide in the form of a flexible hose 105 connecting with a suitable outlet 106 at the bottom of the reservoir and a similar fitting 107 projecting from the block 28' through the cap 36' for conducting the lubricant to the valve port 32', said cap holding the block 28' in place, with the inner end thereof engaged with suitable packing 38'. In this case also I show the cover 45' of the receptacle 42' equipped with a suitable compressed-air inlet 110 whereby the supply of lubricant may be maintained under a corresponding pressure.

The rear end portion of the cylinder 18' is fitted with a clamping ring 112 and screw 113 for the attachment of a coil spring 85 which is secured by an adjusting screw 115 to one side of the frame 10', whereby the gun is maintained in its initial position against a stop buffer 87, and returned to that position after each lubricating operation, as in the preceding construction. If desired, the spring 90 may also be employed in this construction for serving the same functions as already explained in connection therewith.

The operation of this form of the construction is in all essential respects the same as that outlined above in connection with the first type, and need not be repeated in detail, the structural variation being merely that required for supporting the lubricant supply in fixed position, and at the same time adapting the lubricating gun to execute all necessary movements independently of said lubricant supply, as permitted by the flexible hose connection 105. This modification further illustrates the adaptability of the device for use with only one operating spring for effecting the return movement of the gun after each lubricating operation.

In Figures 7 and 8 is illustrated a rotary type of construction providing a plurality of lubricating guns mounted for intermittent rotary movement in one direction for the successive lubrication of the parts of the travelling chain. In this construction the bottom of the lubricant container 120 is formed with a hub extension 121 mounted upon an upright supporting member 122 which, in turn, is mounted for both pivotal and rocking movement as provided by a spherical bearing 123 in a base 124; the upper end of the supporting member 122 projects through the cover 125 of the container into a top bearing block 126 fitted in a guide 127 between a pair of coil springs 128 provided with adjusting screws 130, all arranged in the upper portion of the frame 10'', as illustrated in Figure 7. The hub extension 121 is provided with a plurality of spaced radial sockets 132 which are threaded for the mounting of the threaded ends of a series of cylinders 133 having hollow plungers 134 actuated normally outward by coil springs 135 to present the nozzle elements 136 (of any desired type) on the outer ends of the hollow plunger stems 137 in position for engagement with appropriate fittings 138, carried by the parts of the chain.

The hub extension 121 is further provided with a vertical passage 140 having radial outlets 141 fitted with suitable check valves 142 for controlling communication with the various cylinders 133; suitable lubricant ducts 143 may also be provided in the support 122 for feeding lubricant to its bearings (see Figure 7). As in the other forms of construction, a spring 90 is so located as to successively engage and retain the stem 137 of one of the plungers (preferably the one which is about to be operated) in position for proper engagement with the chain fittings, as shown by the dotted lines in Figure 8.

The principal of operation of this type of construction is the same as in that of the others, with the exception that the series of guns are actuated by the movement of the chain to bring the guns, by an intermittent rotary movement in the same direction about the axis of the support 122, into position for successive engagement and operation by the chain fittings for effecting the lubricating action. This action takes place as before, by retraction of the plungers, their outward movement drawing the lubricant into the cylinders past the valves 142, thence into the hollow plungers, whereupon opposite movement of the plungers, as produced by the thrust imparted from the chain, expels the lubricant through the engaged fittings 136—138 into the parts of the chain. The method of mounting the lubricators and reservoir provides a unitary and compact construction, and affords the same advantages as regards compensating for variations in the chain's travel as in the other forms of the device.

In Figure 9 I illustrate a modified form of device for yieldingly retaining the lubricator in initial position between successive lubricating operations, which comprises a sprocket-shaped cam 150 secured to one of the journals 17' of the gun and engaged by a roller-follower 151 carried by a pin 152 slidingly mounted in a fixed guide 153, enclosing an actuating spring 154 and suitably secured by fastenings 155 to the frame 10.

It will thus be apparent that I have provided a construction which is useful and practical for the efficient and automatic lubrication of moving equipment of the character indicated, and requires no power for its operation other than that derived from the movement of the parts which are being lubricated; all that is required is to locate the device in operative relation to the chain, which may be done while the chain is in motion, and no further attention is thereafter required on the part of the attendant; and thereafter the device may be removed and applied to another chain in the same manner. The pressure with which the lubricant is fed to the chain is limited only by the chain drive, hence if there is resistance due to clogging of the lubricating passages of the chain, this will in practically all cases be overcome by the pressure derived from said drive in the operation of the device, since there is practically no escape for the lubricant except to the chain during each operating interval.

Besides being entirely automatic in its operation, after being once adjusted to the chain and its line of travel, it will be observed that the self-timing feature of this operation does not depend upon the pitch of the chain being uniform, since the initial position of the lubricating gun (particularly in the first two forms of construction) is constant, being set for proper engagement with the chain fittings regardless of the space intervals between them; hence the construction will operate unfailingly with chains of varying pitch due to stretch and wear, as well as with different chains of entirely different pitch. The different forms of construction further provide, as already noted, for all ordinary irregularities as regards the travel of the chain, where these produce deviation from a rectilinear line of travel, which are compensated for by the rocking or oscillating character of the supporting structure.

I am aware of the fact that various types of lubricating devices have been devised and used for the purpose of automatically lubricating chains and the like, including some rotary types of lubricators, but the various features above pointed out are believed to be novel in this relation; and while I have illustrated and described what I now regard as the most practical method of embodying in practice the improved features of my invention, I desire to reserve the right to make whatever changes or modifications may fairly fall within the spirit and scope of the appended claims.

Having described my invention, what I claim to be new and desire to secure by Letters-Patent is:

1. Apparatus for lubricating moving equipment having spaced lubricant-receiving fittings, comprising a movable lubricating device in position for engagement by said fittings and operated by the travel thereof for feeding lubricant to the fittings, and means acting automatically between successive lubricating operations to set and latch said device comprising a stop element for limiting the return movement of the device into a predetermined position for operative engagement by said fittings and also a spring element operative by wiping engagement with said device to prevent any rebound thereof from said predetermined position.

2. Automatic lubricating mechanism for travelling chains and the like, comprising a movable lubricating device in position for engagement by spaced portions of the chain and operated by the travel thereof to discharge lubricant to the chain, a spring member acting automatically between successive lubricating operations to return said device to a fixed predetermined initial position in readiness for the next operative engagement, and means providing selective points of attachment of said spring member to said device for swinging the latter in either of two opposite directions to initial inoperative position in accordance with the direction of travel of the chain.

3. Apparatus for lubricating moving equipment, comprising a movable lubricating device actuated by successive engagement with spaced lubricating points on said equipment for feeding lubricant thereto, supporting means mounted for rocking and compensating movement of the device for accommodating irregularities in the movement of said equipment, and means for automatically latching said device in position for operative engagement with the equipment between successive lubricating operations.

4. Automatic lubricating mechanism for travelling chains and the like, comprising a movable lubricating device actuated by successive engagement with spaced lubricating points on the chain for feeding lubricant thereto, and supporting means providing for rocking movement of the device about an axis substantially parallel with the line of travel of the chain to permit compensating movement of said device for accommodating deviations of the chain from the straight line of travel thereof.

5. In combination with a travelling chain or the like, lubricating fittings carried at spaced intervals by said chains, a pivotal device having a reciprocating plunger fitted with a discharge nozzle in position for operative engagement with said fittings and actuated by the travel thereof to feed lubricant to the chain, and yielding means adjustable for swinging said device in either of two opposite directions to an initial position of rest depending upon the direction of travel of the chain.

6. In combination with a travelling chain or the like, lubricating fittings carried at spaced intervals by said chain, a pivotal device mounted for rocking movement about an axis substantially parallel with the line of travel of the chain and having a reciprocating plunger fitted with a discharge nozzle in position for operative engagement with said fittings and actuated by the travel thereof to feed lubricant to the chain, means for returning said device to initial position after each lubricating operation, and a spring device operative to frictionally latch said pivotal device in a predetermined position of rest.

7. In combination with a travelling chain or the like, lubricating fittings carried at spaced intervals by said chain, a pivotal device mounted for rocking movement about an axis substantially parallel with the line of travel of the chain and having a reciprocating plunger fitted with a discharge nozzle in position for operative engagement with said fittings and actuated by the travel thereof to feed lubricant to the chain, means for returning said device to initial position after each lubricating operation, and a spring member mounted in the path of movement of said device and operative to engage and latch said plunger in position for operative engagement with said chain fittings.

8. In combination with a travelling chain or the like, lubricating fittings carried at spaced intervals by said chain, a pivotal device having a reciprocating plunger fitted with a discharge nozzle in position for operative engagement with said fittings and actuated by the travel thereof to feed lubricant to the chain, yielding means for returning said device to its initial position, positive stop means for limiting said return movement of the device, and a leaf spring element located in position for engagement with said plunger for latching the same against said stop means.

9. Automatic lubricating mechanism for travelling chains and the like, comprising a supporting member mounted for rocking movement about an axis substantially parallel with the line of travel of the chain, and a lubricating device carried by said supporting member and mounted for swinging movement thereon in a direction approximately conforming to the path of the chain's travel, said device having means for successive engagement with spaced lubricating points on the chain.

10. Automatic lubricating mcehanism for travelling chains and the like, comprising a base member, a supporting member carried by said base member and mounted for rocking movement thereon about an axis substantially parallel with the line of travel of the chain, a lubricating device carried by said supporting member and mounted for swinging movement thereon in a direction approximately conforming to the path of the chain's travel, said device having means for successive engagement with spaced lubricating points on the chain, and means for reciprocating said supporting member for regulating the distance between said lubricating device and the path of the chain.

11. Automatic lubricating mechanism for travelling chains and the like, comprising a movable supporting member, a lubricating device carried by said supporting member for movement therewith adjacent to the path of travel of the chain and in the plane of said travel, said supporting member being mounted for rocking movement for permitting said lubricating device to conform to irregularities in the chain's travel, and lubricating means carried by said device for successive engagement with spaced lubricating points on the chain.

ROBERT LEE PATE, Jr.